United States Patent
Tani

[15] 3,693,772
[45] Sept. 26, 1972

[54] CENTRIFUGAL CLUTCH

[72] Inventor: Eiji Tani, No. 6,4,4-chome Hannancho, Abeno-ku, Osaka, Japan

[22] Filed: Dec. 29, 1970

[21] Appl. No.: 102,457

[52] U.S. Cl. ............ 192/105 CD, 192/72, 188/250 E
[51] Int. Cl. ............................................. F16d 43/24
[58] Field of Search ...... 192/105 CD, 105 CP, 103 B, 192/72; 188/250 E

[56] References Cited

UNITED STATES PATENTS

| | | | |
|---|---|---|---|
| 1,972,643 | 9/1934 | Chapman | 192/150 CD |
| 2,015,829 | 10/1935 | White | 188/250 E |
| 2,571,432 | 10/1951 | Farkas | 188/250 E |
| 2,588,482 | 3/1952 | Chapman | 192/105 CD |
| 3,208,571 | 9/1965 | Bochory | 192/105 CD |

FOREIGN PATENTS OR APPLICATIONS

| | | | |
|---|---|---|---|
| 770,768 | 3/1957 | Great Britain | 192/105 CD |
| 962,975 | 7/1964 | Great Britain | 192/105 CD |

*Primary Examiner*—Benjamin W. Wyche
*Assistant Examiner*—Randall Heald
*Attorney*—James E. Armstrong and Ronald S. Cornell

[57] ABSTRACT

A centrifugal clutch is provided for transmitting power smoothly and stably from a drive shaft to a follower drum by shoes contacting the inside surface of the drum via lever members pivotally fixed at one end to a shoe and at the other end to the drive shaft or to a base plate fixed to the shaft.

The pivots of the levers on the shoes are disposed on the leading portion of the shoes in the direction of rotation. The angle between a radius passing through the pivots on the shaft or the base plate and the axes of the lever connecting both pivots of the lever is arranged to be acute at all times.

The above features in combination serve to prevent wear of all parts conventionally caused by a pendulum motion of the shoes during acceleration and deceleration and thus serve to extend the lift of the clutch.

11 Claims, 2 Drawing Figures

CENTRIFUGAL CLUTCH

FIELD OF THE INVENTION

This invention relates to a centrifugal clutch, more particularly, to a clutch transmitting power to an external follower drum by centrifugal expansion of shoes disposed therein and connected to a drive shaft.

SUMMARY OF THE INVENTION

According to the invention, two or more arc shaped shoes, connected to the periphery of a prime mover drive shaft through lever members, being disposed circularly and positioned within a drum integral with a follower shaft or the like, are expanded by centrifugal force, causing their external linings to contact to the internal surface of the drum with pressure to transmit rotation to the follower. A base end of a lever member is pivotably mounted on the drive shaft or on a base plate fixed to the shaft, and the other operating end of the lever member is also pivotably mounted on the arc shaped shoe near the mid point thereof. In this case, the angle between a radius passing through the base and pivot of oppositely positioned lever members and a line connecting both base and operating end pivots of a lever member, is arranged to be acute at all times, including the time during which the clutch is in operation. Positioning of the operating end pivot of the lever in the leading side of the shoe in advance of the trailing side thereof in the direction of rotation, that is, positioning said operating pivot on an advanced half of the shoe with respect to the direction of rotation, causes the weight of the leading side to be lighter than that of the trailing side, thus enabling the latter to contact slidably with the inner surface of the drum more quickly than the former as a result of the centrifugal force.

The foregoing construction serves to ease and smooth the expansion and contraction of the shoes during periods of speed variation of the prime mover shaft and in addition, to restrict to a minimum beats and shocks of the linings between initial and midway rotation transmission operation, thereby supressing shock noise, and achieving stable operation of the clutch over an extended life period.

BRIEF DESCRIPTION OF THE DRAWINGS

The invention will be more fully understood from the following description, taken in conjunction with the accompanying drawings in which.

DETAILED DESCRIPTION OF THE INVENTION

Figure 1:
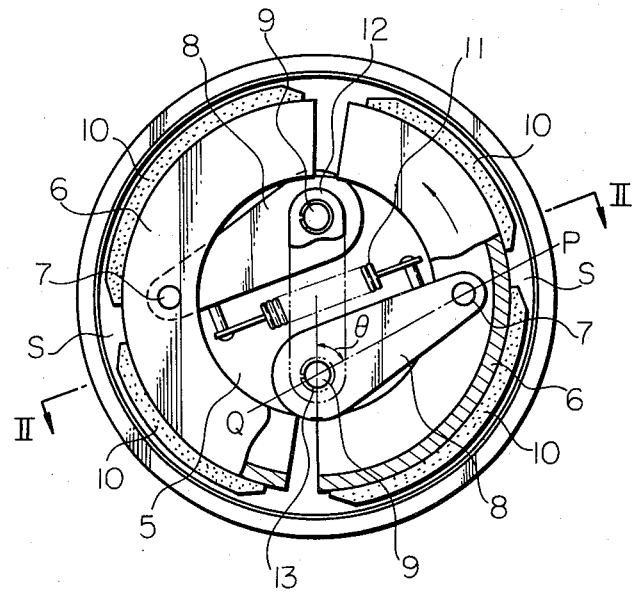
FIG. 1 is a sectional front view of a centrifugal clutch embodying the invention.
Figure 2:
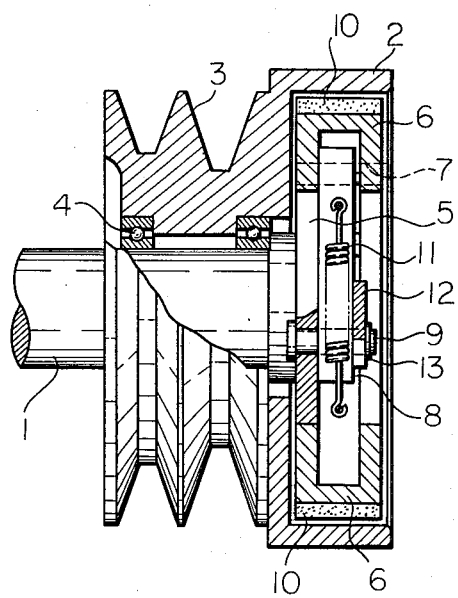
FIG. 2 is a partial sectional side view taken along the line II— II in FIG. 1.

A drum 2 integral with a follower 3, such as a pulley, gear, propeller shaft, etc. is supported rotatably through ball bearings 4 at the end of drive shaft 1, A base plate 5 is fixed at the drive shaft end, being arranged in circular shape within the drum 2, and serves to secure pivot pins 9, 9 for pivotably supporting the base ends of lever members 8, 8, the other ends of which are also pivotably connected to separate arcuate shoes b, 6, which are (at least) two in number. Base plate 5 receives and supports shoes 6, 6, when the shoes are contracted by spring 11.

Assuming that drive shaft 1 and shoes 6, 6 rotate in a counter clockwise direction, the front angle of lever member 8 (taken in the direction of rotation), or in other words, the angle $\theta$ subtended between a radius passing through base end pivots 9, 9 and a line PQ connecting the two pivots 7 and 9, is arranged to be acute. Concurrently the position of pivot 7 of lever member 8 on shoe 6 is shifted from a location in the center of the shoe to an advanced location in the direction of rotation. The trailing end or rear of the shoe is the first portion to make contact with the drum in the direction of rotation, due to the increased weight of rear portion of the shoe. Linings 10 adhered to the external surface of the shoe adjacent to extended line PQ connecting both pivots 7 and 9 of lever 8 are divided by partial removal of the lining to form a reasonably sized crevice in which there is no lining. Spring 11 is arranged between corresponding parts of levers 8, 8 to contract shoes 6, 6 internally and stop plates 12, which restrain the lever members, are fixed on pivot pins 9, 9 by snap rings 13. A mass difference between the leading portion and trailing portion is achieved by pivoting lever members 8,8 on shoes 6,6 at an advanced location in the direction of rotation, or by giving a weight of proper mass to the trailing portion of shoes 6,6.

The construction shown in the drawing, in which shoes 6, 6 are formed in inwardly-directed U-shaped cross-section and the end edges of the levers protrude into the rear opening of the shoes, is required in order to dispose the pivot 7 on the end of lever member 8 in the middle of the breadth of shoe. However, the construction may be changed to other forms of connecting the shoes and lever members, for example, by pins disposed on one side of a solid shoe and pivotally through a fork section formed at the ends of the lever members.

Operation of the clutch according to the invention is as follows. When the drive shaft rotates in a counter clockwise direction below a predetermined speed, since shoes 6, 6 are pulled together inwardly by spring 11 via lever members 8, 8, linings 10 do not contact with the drum 1, and the follower does not move. However, when the rotation speed of the drive shaft reaches a predetermined value, shoes 6, 6 expand outwardly by a slight clockwise rotation of lever members 8, 8 around pivot 9, overcoming the tension of spring 11 due to centrifugal force, and cause linings 10 to push against the inner surface of drum 1, resulting in rotation of follower 3. The contact of the lining 10 to drum 1 begins at the trailing ends of the shoes, because the weight of the trailing parts of the shoes separated by pivots 7, 7 of the lever members is greater than that of the leading parts thereof as described above. Further, since the front angle $\theta$ in the direction of rotation is made acute, expansion forces are less than in the case of the angle $\theta$ being obtuse resulting in a gradual sliding along the lining surfaces at the beginning of the rotation transmission to achieve smooth rotation.

On the other hand, when the rotation speed of the shaft and thereby the centrifugal force begin to reduce, shoes are drawn inwardly via the lever members by spring 11, and thus rotation transmission against follower 3 is interrupted gradually.

As stated above, according to the centrifugal clutch of the invention, by pivotally fixing each operating end edge of the lever members (the other ends of the levers being pivoted on an equidistant circle of the base plate) and the corresponding parts of the levers being pulled toward each other by spring 11, the pivot points 7, 7 are shifted to the advanced or leading portions of the shoes (with respect to the middle points thereof) to make the weight of the trailing parts of the shoes greater than that of the leading parts. Since the angle $\theta$ subtended between the radius passing through the base end pivots 9, 9 and the line connecting both pivots 7 and 9 is arranged to be acute linings adhered to the outer preiphery of the shoes are divided near the extension of the line connecting both pivots of the lever to form a crevice having specified width. When the rotation speed reaches a predetermined required value sufficient to expand the shoes by centrifugal force against the contracting spring, the contact of the linings to the drum begins from the trailing ends of the shoes and then is followed by the contact of the leading ends thereof; thus smoother contacts and milder rotation transmission are obtained. In addition, because the operating angle $\theta$ is acute, making the lever arm long, the contacting force is applied gradually and although contraction of the shoes during the reduction of speed becomes abrupt, a sliding contact at the beginning of the rotation transmission is effected to achieve stable operation. Ultimately, the entire surfaces of the linings are pushed against the drum with uniform pressure; thus with such a compact clutch, greater power can be transmitted with extremely stable operation over a longer period of time.

What is claimed is:

1. A centrifugal clutch, capable of transmitting considerable power while being relatively small in size, comprising in combination:
   a. a follower drum having at least two separate arcuate shoes disposed therein;
   b. lever members pivotably connected at their base ends to a drive shaft and at their operating ends to said shoes by operating pivot, said lever members being arranged such that an angle formed by a radius passing through the pivots of said base ends and a line extending through the base and operating end pivots is acute;
   c. means for contracting said lever members; and
   d. lining disposed on said shoes;
   e. each of said operating pivots located circumferentially between the ends of a shoe, and said operating pivots being located closer to the forward end of said shoe than the rearward end of said shoe; whereby the portion of said shoe rearwad of said operating pivot is heavier than the portion forward of said operating pivot.

2. A clutch according to Claim 1 in which the follower drum is rotatably supported by ball bearings on the drive shaft and a gear is operatively associated with said drum.

3. A clutch according to Claim 1 in which a pulley is operatively associated with said drum.

4. A clutch according to Claim 1 in which a propeller shaft is operatively associated with said drum.

5. A clutch according to Claim 1 in which two arcuate shoes are disposed within the follower drum.

6. A clutch according to Claim 1 in which the lever members are contracted by a spring.

7. A clutch according to Claim 1 in which the shoes are of inverted V-shaped cross-section and the lever members are pivotably connected thereto by bridge pins positioned within the U.

8. A clutch according to Claim 1 in which the shoes are of solid cross-section and the lever members have a fork shaped operating ends which are pivotably connected to the shoes by stationary pins protruding from the sides of the shoes.

9. A clutch according to Claim 1 in which the base end pivots are attached to a base plate fixed to the drive shaft.

10. A clutch according to claim 1 in which the operating ends of the levers are pivoted to the shoes on the leading portion thereof.

11. A clutch according to claim 1 in which a weight of a predetermined mass is given to the trailing portion of the shoes.

* * * * *